United States Patent [19]

Yasuda et al.

[11] Patent Number: 4,588,989

[45] Date of Patent: May 13, 1986

[54] SUPERVISORY DEVICE FOR WRONG OPERATION OF VARYING QUANTITY MEASURING APPARATUS

[75] Inventors: Mamoru Yasuda; Takeshi Nishimura, both of Kawasaki, Japan

[73] Assignee: Mitutoyo Mfg. Co., Ltd., Tokyo, Japan

[21] Appl. No.: 580,459

[22] Filed: Feb. 15, 1984

[30] Foreign Application Priority Data

Feb. 22, 1983 [JP] Japan ................... 58-28168

[51] Int. Cl.⁴ .............................. G08B 21/00
[52] U.S. Cl. ......................... 340/663; 307/66; 340/333
[58] Field of Search ............ 340/663, 636, 333, 347 P; 177/DIG. 6; 307/66

[56] References Cited

U.S. PATENT DOCUMENTS

| | | | |
|---|---|---|---|
| 3,603,973 | 9/1971 | Hough | 340/333 X |
| 3,641,570 | 2/1972 | Thompson | 340/333 X |
| 3,702,469 | 11/1972 | Golja | 340/333 X |
| 3,813,667 | 5/1974 | Smith | 340/663 X |
| 4,315,162 | 2/1982 | Ferguson | 340/663 X |
| 4,367,423 | 1/1983 | Hornung | 340/663 X |
| 4,438,431 | 3/1984 | Toyomura | 340/636 X |

Primary Examiner—James L. Rowland
Assistant Examiner—Daniel Myer

[57] ABSTRACT

A supervisory device of a varying quantity measuring apparatus including a main scale and an index scale which are moved relative to each other in accordance with a physical varying quantity, a main power supply circuit which outputs a predetermined DC stabilized voltage by operating a power switch, and an encoder which is driven by the voltage output from the main power supply circuit and converts the relative movement of said both scales into electric signals to be displayed. This device further includes an under voltage detecting circuit for supplying an under voltage detecting signal when the output voltage from said main power supply circuit falls below a standard voltage which is preestablished as the necessary voltage for normal operation of the encoder, and an error message output circuit for outputting an error message when the power switch of the main power supply circuit is operated as well as when an under voltage detecting signal is inputted, and is characterized in that errors in operation of the encoder caused by insufficient output voltage from the main power supply circuit can be displayed as an alarm by means of the error message from the error message output circuit.

1 Claim, 3 Drawing Figures

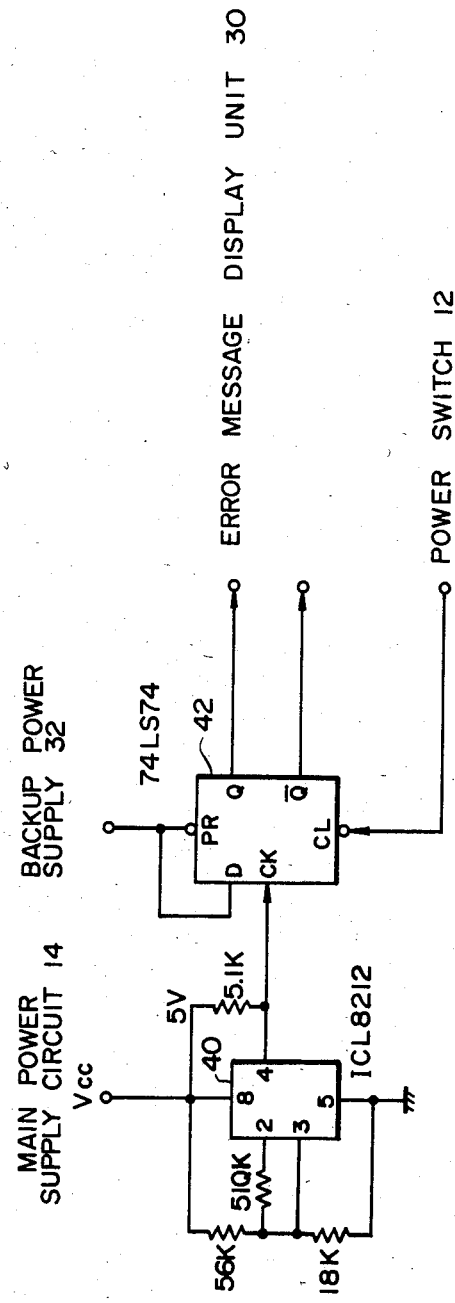
F I G. 2

SUPERVISORY DEVICE FOR WRONG OPERATION OF VARYING QUANTITY MEASURING APPARATUS

BACKGROUND OF THE INVENTION

1. Field of the Invention

The pesent invention relates to a supervisory device for wrong operation of varying quantity measuring apparatus, and more particularly to a supervisory device for wrong operation of varying quantity measuring apparatus which measures a physical varying quantity by relative movement between a main scale and an index scale.

2. Description of the Prior Art

There has been a well-known physical varying quantity measuring apparatus which measures a certain physical varying quantity by relative movement between a main scale and an index scale, and is of wide use for the measurement of length and physical varying quantity in length measuring instruments, coordinate measuring machines, etc. or in positioning or the like of machine tools, or for the other purposes.

This varying quantity measuring apparatus includes a main scale and an index scale which are moved relative to each other in accordance with a physical varying quantity and an encoder which detects the relative movement of such two scales and measures the requested physical varying quantity based upon the relative movement of such two scales which can be detected by this encoder.

The encoder mentioned above detects the relative movement of both two scales as an electric signal by optical, electromagnetic or well-known means using contact resistance, and further converts the detected signal into a count pulse signal in accordance with the relative movement per unit time to supply this to a counter provided in the encoder. The counter counts the supplied count pulse signal, and the counted value of the count pulse signal is displayed as a digital value representing a measured value of the physical varying quantity or is used for an other control signal.

Accordingly, this varying quantity measuring apparatus can measure the physical varying quantity with accuracy as a predetermined digital signal by means of relatively moving the main scale and the index scale in accordance with the desired physical varying quantity.

The varying quantity measuring apparatus mentioned hereinabove, however, clears the counted value of the count pulse signal stored in the encoder, when the electric power stops or lowers the voltage to great extent for some reason, and restart counting the count pulse signal from the very beginning, when the electric voltage recovers up to the optimum level. Accordingly, when the electric power stops or lowers its voltage, there arise measuring errors between the relative moving quantities of the main scale and the index scale which are converted into the electric signal by the encoder to be displayed and the actual moving quantities of these two scales. Furthermore, it is a problem that the error occurrence is not known to those at measuring work in most cases.

Especially, in such a case that the electric power suspension or low voltage is instantly caused by the start or the stop of a large machine, the sudden load change, or the like for example, the encoder immediately restart counting the count pulse right after the counted value of the count pulse signal is cleared, which is not known to those at measuring work in most cases, and an effective countermeasure has been requested.

SUMMARY OF THE INVENTION

Accordingly, it is a general object of the present invention to provide a supervisory device for wrong operation of varying quantity measuring apparatus which can firmly detect a wrong operation of encoder caused in insufficient voltage to measure a physical varying quantity with accuracy.

In keeping with the principles of the present invention, the object is accomplished with a supervisory device for wrong operation of a varying quantity measuring apparatus which comprises an under voltage detecting circuit for supplying an under voltage detecting signal when the voltage output from the main power supply circuit lowers under a voltage which is preestablished as the necessary voltage for normal operation of the encoder, and an error message output circuit for outputting an error message when the power switch of the main power supply circuit is operated on and the under voltage detecting signal is inputted. The varying quantity measuring apparatus further includes a main scale and an index scale which are moved relatively to each other in accordance with a physical varying quantity, a main power supply circuit which outputs a predetermined DC stabilized voltage by means of operating a power switch, and an encoder which is driven by the output voltage from the main power supply circuit and converts the relative movement of the two scales into an electric signal to be displayed, wherein wrong operation of the encoder caused from the insufficient output voltage from the main power supply circuit can be displayed as an alarm by means of the output of the error message.

BRIEF DESCRIPTION OF THE DRAWINGS

FIG. 2 is a circuit diagram showing a concrete embodiment of a part of the circuit used for the device illustrated in FIG. 1.

DETAILED DESCRIPTION OF THE EMBODIMENTS

Figure 1:
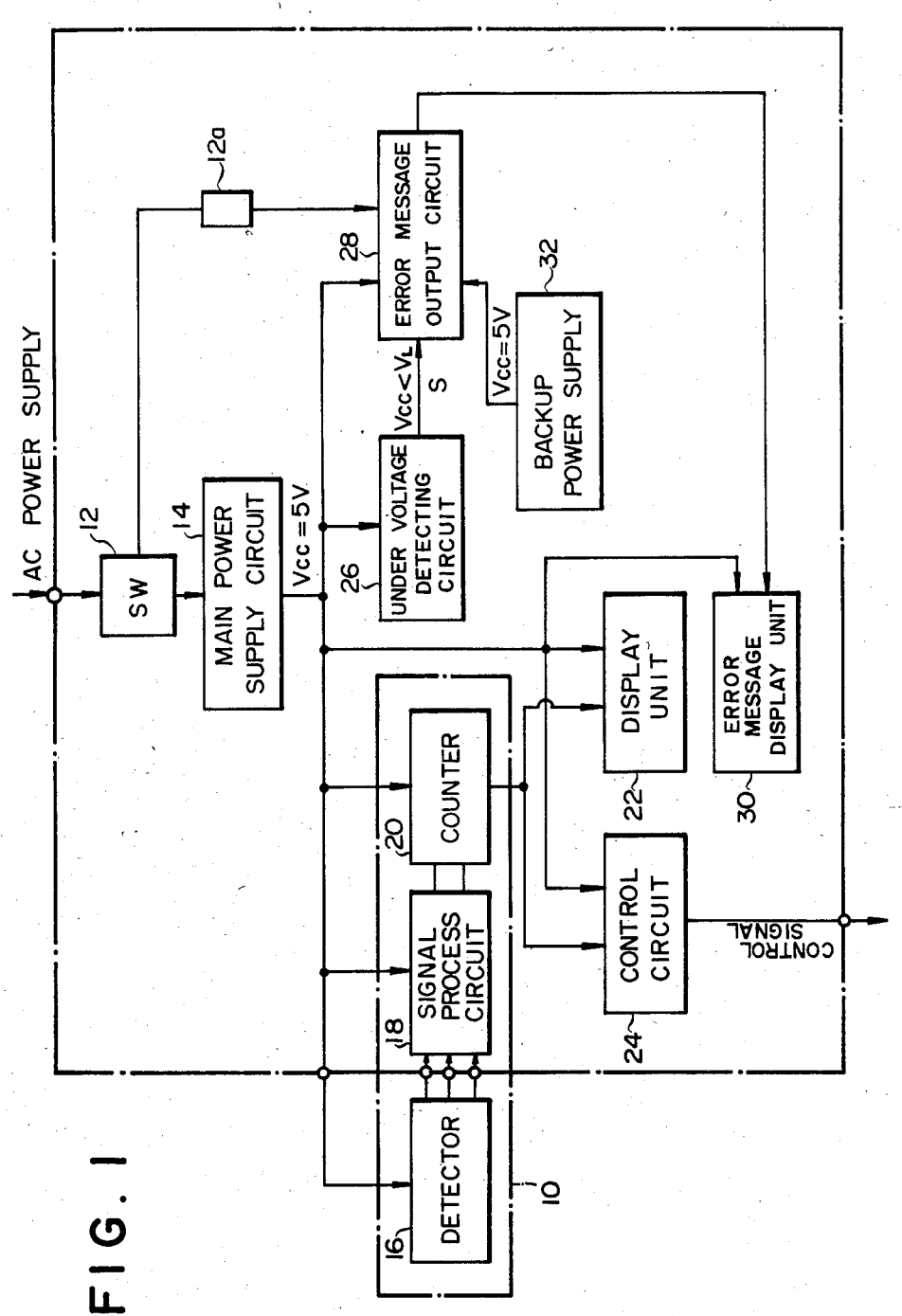
FIG. 1 is a block diagram showing a preferred embodiment of the device of the present invention.

Referring more particularly to the drawings, FIG. 1 shows a preferred embodiment of varying quantity measuring apparatus which the present invention is applied to. The measuring apparatus of the embodiment includes a main scale and an index scale, not illustrated, which are moved relatively to each other in accordance with a predetermined physical varying quantity and an encoder 10 which converts the relative moving quantities of these two scales in order to be displayed, and starts measuring the requested physical varying quantity by means of switching on a power switch 12.

The on-operation of the power switch 12 inputs to a main power supply circuit 14 the AC voltage which is supplied from the outside of the measuring apparatus. The main power supply circuit 14 converts the AC voltage into the DC voltage and supplies the predetermined DC stabilized voltage Vcc, 5 V in this embodiment, to the above mentioned encoder 10 and the other circuits.

When the encoder 10 is supplied the DC stabilized voltage Vcc from the main power supply circuit 14 as mentioned above, it measures the relative movement of the main scale and the index scale, which are not illustrated, by optical, electromagnetic or contact means and converts them into an electric signal to be displayed.

In this measuring apparatus in this embodiment, the relative movement of these two scales are measured by such well-known optical means that the varying quantity is measured by the light penetrated through or reflected against predetermined optical latices respectively prepared on both of the scales.

In order to do this, the encoder 10 in this embodiment includes a detector 16 which detects variation of the light in accordance with the relative movement of both scales, a signal process circuit 18 which converts the varying quantity of the light per unit time detected by the detector 16 into a predetermined count pulse signal and a counter 20 which counts the count pulse signal output from this signal process circuit 18. The counted value of the pulse signal at the counter 20 is determined as the relative movement of both scales, in other words, the physical varying quantity.

The physical varying quantity measured by the encoder 10 as mentioned above is displayed by a display unit 22. When the measured value of this physical varying quantity is used to control a desired machine tool for example, the counted value of the pulse signal at the counter 20 is inputted to a control circuit 24 which outputs a control signal to the desired machine tool on the basis of the counted value of the count pulse signal outputted from the counter 20. Accordingly, when a spindle, for example, is controlled to deliver products by the control circuit 24, the rotation and the start or the stop of this spindle can be firmly controlled.

In such a kind of varying quantity measuring apparatus, however, when the DC stabilized voltage supplied from the main power supply circuit 14 is tentatively stopped or is substantially lowered for some reason, the value of count pulse counted in the counter 20 is cleared, and, upon the recovery of the voltage, the count is again restarted from the very beginning of the count pulse signal. Because of this, the display unit 22 displays a wrong measured value of the physical varying quantity and an effective countermeasure is required for correct control when a machine tool is controlled by such counted value of the counted pulse, for example.

The present invention can firmly supervise the wrong operation of the encoder 10 caused by low output voltage from the main power supply circuit 14 as mentioned above, and can effectively cope with an occurrence of such wrong operation.

In order to meet the above mentioned, the device according to the present invention includes an under voltage detecting circuit 26 which outputs an under voltage detecting signal S when the main power supply circuit 14 outputs a voltage Vcc lower than a standard voltage $V_L$ which is preestablished as the necessary standard voltage $V_L$ to normally operate the encoder 10, and an error message output circuit 28 which outputs an error message when the main power supply circuit 14 is switched on and the under voltage detecting signal S is inputted to the circuit 28, and displays the error message on an error message display unit 30.

To the error message output circuit 28, in the device of this embodiment, is provided a backup power supply 32 so that the error message output circuit 28 can work normally even if the main power supply circuit 14 does not supply enough voltage Vcc. This backup power supply 32 outputs a predetermined DC stabilized voltage Vcc to the error message output circuit 28, and any kind of DC power supply which can be charged by the power supplied by the main power supply circuit 14, normal batteries, etc., can be used.

Furthermore, in the device of this embodiment, provided therein is an auxiliary power switch 12a between the power switch 12 and the error message output circuit 28 so that the operation of this auxiliary power switch 12a can clear the error message output, whenever the error message output circuit 28 outputs an error message.

According to the device of the present invention composed as mentioned heretofore, when the level of the voltage supplied from the main power supply circuit 14 lowers or stops for some reason during measurement of none physical varying quantity after the on-operation of the power switch 12, the error message outputted from the error message output circuit 28 is displayed on the error message display unit 30, and the wrong operation of the encoder 10 derived from low voltage output from the main power supply circuit 14 is firmly acknowledged by those conducting the measuring.

In this device of the present invention, furthermore, such a composition is adopted that the error message output circuit 28 outputs the error message only in the case that the under voltage detecting signal is supplied during the on-state of the power switch 12, and an incorrect output of the error message is prevented when the off-operation of the power switch 12 cuts off the voltage supplied from the main power supply circuit 14.

As mentioned heretofore, according to the device of the present invention, the wrong operation of the encoder 10 caused from insufficient voltage supplied from the main power supply circuit 14, tentative power suspension or low voltage for example, can be reliably detected so that the requested measurement of the physical varying quantity can be performed with accuracy.

Figure 3:
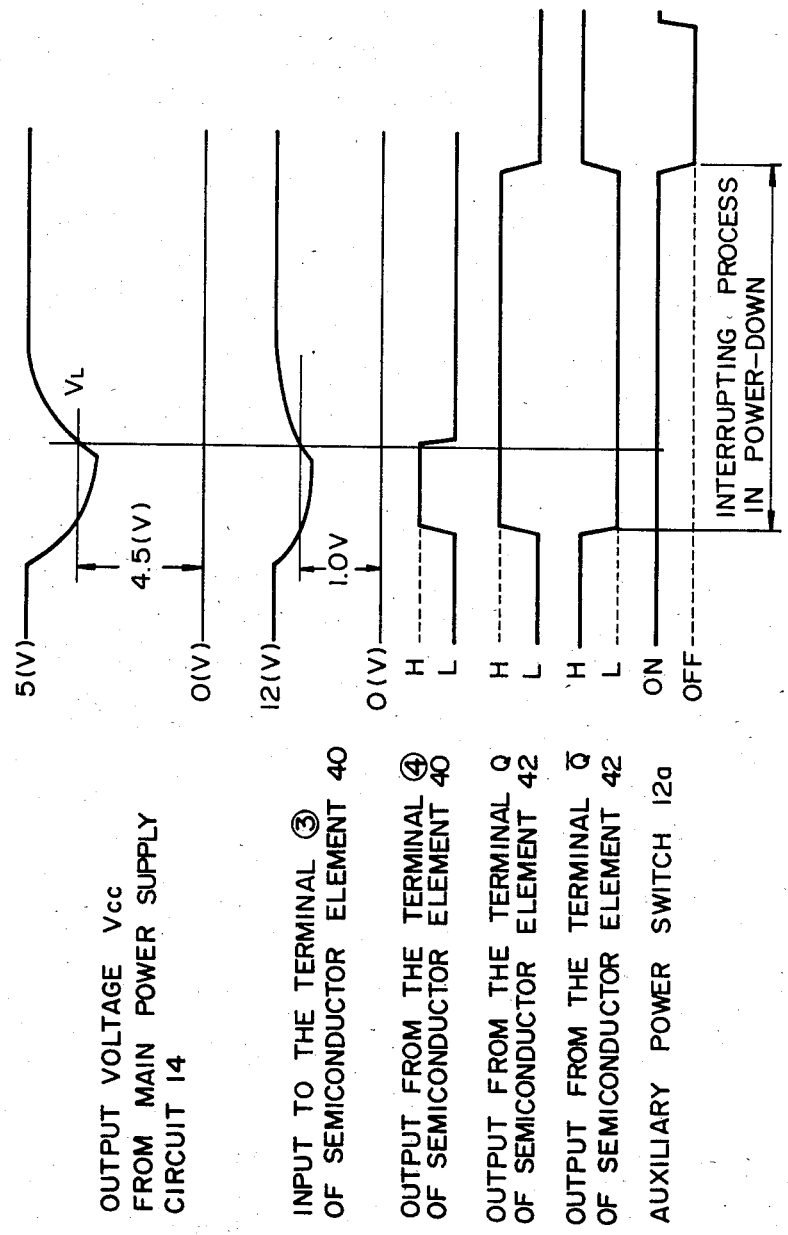
FIG. 3 is a timing chart of the respective places shown in FIG. 2.

In FIG. 2 shown therein is a concrete embodiment of the under voltage detecting circuit 26 and the error message output circuit 28, and FIG. 3 shows signal wave forms in various places in the circuit illustrated in FIG. 2.

The under voltage detecting circuit 26 includes an IC semi-conductor element 40 such as an ICL8212, and is constructed to output the under voltage detecting signal of an H level from an output terminal 4 of the IC semi-conductor element 40 when the output voltage Vcc supplied from the main power supply circuit 14 lowers under 4.5 V.

On the other hand, the error message output circuit 28 is formed with an IC semi-conductor element 42 such as a 74LS74 to which the predetermined DC voltage Vcc is supplied from the backup power supply 32. A CL terminal and a CK terminal of this IC semi-conductor element 42 respectively receive the signals supplied via the power switch and from an output terminal 4 of the IC semi-conductor element 40, and the H level signal representing the error message is outputted from a terminal Q toward the error message display unit 30.

At this point, since this IC semi-conductor element 42 is formed so that the terminal Q can output the H level signal only in such a case that the CK terminal is inputted with the H level signal when the CK terminal continues to receive an on-signal of an H level after the power switch is on. As a result, the error message of an H level is outputted to the error message display unit only when the under voltage detecting signal of an H level is inputted from the element 40 with the power switch 12 in the on-state, as is shown in the timing chart of FIG. 3.

Furthermore, this semi-conductor element 42 continues to output the H level signal until the power switch 12 or the auxiliary power switch 12a is switched off afterwards, once this element 42 outputs the H level signal representing the error message from its terminal Q. The error message display unit 30, therefore, keeps on displaying the error message until the power switch 12 of the auxiliary power switch 12a is switched off.

As described heretofore, according to the present invention, since the wrong operation of the encoder caused from the insufficient voltage output from the main power supply circuit can be alarmingly displayed with accuracy by means of the output of error message, the normal or error operation of the encoder can be firmly judged and the requested measurement of physical varying quantity can be performed with accuracy.

What is claimed is:

1. A displacement measuring apparatus comprising a main power supply which outputs a predetermined DC stabilized voltage in response to the turning on of a power switch, an encoder which is energized by an output voltage from the main supply circuit to convert the relative displacement of a main scale and an index scale into electric pulse signal being supplied to a counter, a display unit for displaying the digitally counted value of the counter, and an error warning device for warning of an error in display of the counter, wherein the error warning device comprises:

a voltage drop detecting circuit for supplying a voltage detecting signal when the output voltage from the main power supply circuit drops under a reference voltage which is predetermined as a necessary voltage for required error free operation of the encoder;

an error message output circuit for outputting an error message when the voltage drop detecting signal is generated when the power switch of the main power supply circuit is turned on;

an error message display unit for displaying the error message supplied from the error message output circuit;

a back-up power supply means independently provided from the main power supply circuit for supplying back-up DC stabilized voltage to the error message output circuit;

an auxiliary switch connected between the main power switch and the error message output circuit for clearing an error message register in the error message output circuit to stop the outputting of said error message;

wherein the occurrence of main power output voltage under the reference voltage produces an error message upon the error message display unit and the error message is not cleared with the main power voltage drop due to the back-up power supply, but cleared by either turning off the power switch or the auxiliary switch.

* * * * *